March 29, 1938.    E. R. MORTON    2,112,541
MEASURING CIRCUITS
Filed April 25, 1935
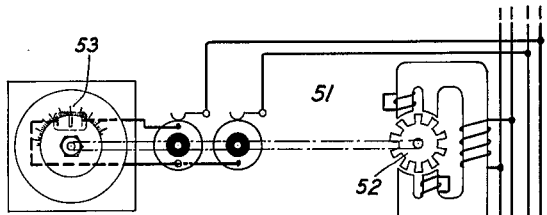
FIG. 1
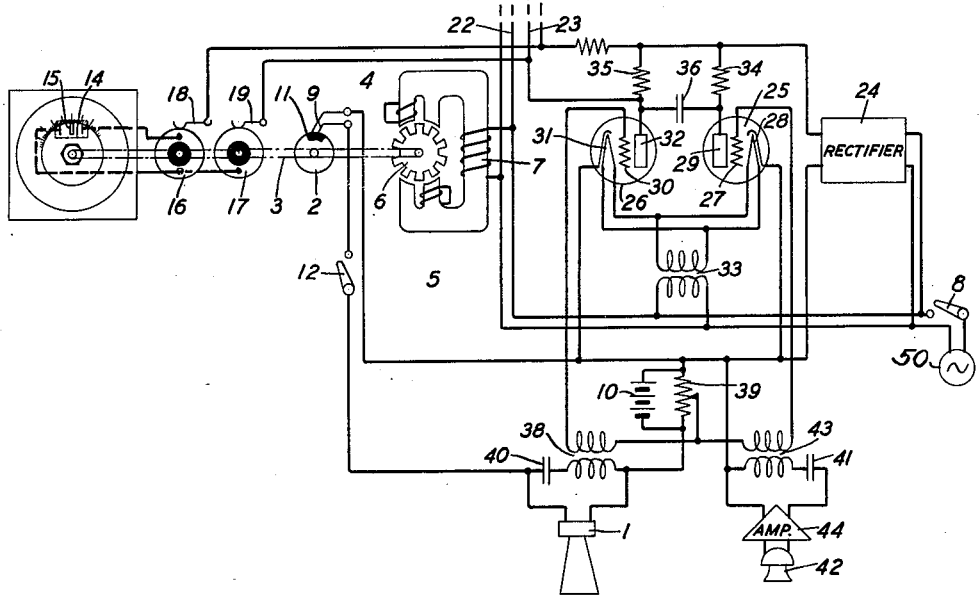
FIG. 2
FIG. 3
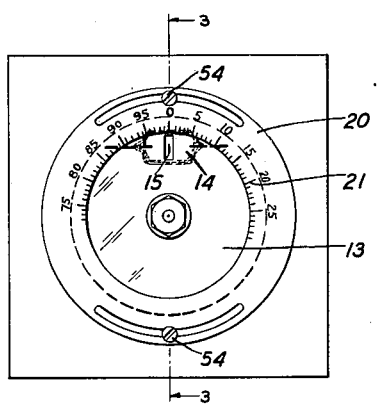
INVENTOR
E. R. MORTON
BY Wayne B Wells
ATTORNEY Patented Mar. 29, 1938

2,112,541

UNITED STATES PATENT OFFICE 2,112,541

MEASURING CIRCUITS

Edmund R. Morton, New York, N. Y., assignor to Bell Telephone Laboratories, Incorporated, New York, N. Y., a corporation of New York Application April 25, 1935, Serial No. 18,142

6 Claims. (Cl. 177—386)

This invention relates to measuring circuits and particularly to measuring circuits for determining the distance of a body away from a reflecting surface as for example the distance of an aeroplane above the earth or the depth of water below a vessel.

One object of the invention is to provide a measuring circuit that shall have a plurality of stations on a ship for indicating the distance to earth below the ship in a new and improved manner.

Another object of the invention is to provide a measuring circuit having two gas-filled space discharge devices respectively broken down when a signal is transmitted from a ship and when the signal is reflected back to the ship that shall light a lamp upon breakdown of one device and extinguish the lamp upon breakdown of the other device to indicate the distance to earth from the ship according to the period the lamp is lighted.

A further object of the invention is to provide a measuring circuit for a ship that shall have a gas-filled space discharge device broken down and a lamp lighted when a signal is transmitted from the ship and that shall break down a second gas-filled space discharge device to extinguish the first device and the lamp when the signal is reflected back to the ship whereby the distance to earth below the ship is indicated by the period the lamp is lighted.

In measuring the depth of water below a vessel or the height in the air of an aeroplane it is customary to transmit a signal from the vessel or the aeroplane and obtain a reflection back to the vessel or aeroplane from the reflecting surface, the distance to which is to be measured. The period between the transmission of the signal and the reflection back to the vessel or aeroplane gives an indication of the distance away from the vessel or aeroplane of the reflecting surface.

In an acoustic circuit which has been employed to illustrate the invention, a sound source in the form of a loudspeaker or impact oscillator transmits a signal from the vessel or aeroplane to the reflecting surface which may be the surface of the earth. The signal after reflection from the surface of the earth is received by a microphone. The period between the transmission of the signal and the operation of the microphone by the reflected signal indicates the distance away from the vessel or aeroplane of the reflecting surface.

In the circuit employed to describe the invention a plurality of indicating stations are located at various points on a ship. At one station, which may be designated as the central indicating station, a synchronous motor is provided for rotating not only a measuring disc carrying an indicating lamp but also a contactor for controlling a transmitter which may be in the form of an impact oscillator of the type disclosed in the patent to R. L. Williams 1,689,574, October 30, 1928. The transmitter serves to produce a sound which is transmitted to the surface of the earth and reflected back to the ship. The signal reflected back to the ship serves to operate a microphone. A lamp is provided at each indicating station. Each lamp is lighted when the transmitter is operated to transmit a signal to the surface of the earth. The lamps remain operated until the reflected signal is received. Accordingly the distance between the ship and the surface of the earth is indicated by the period the lamps are lighted. Preferably each of the lamps located at the indicating stations is rotated by a synchronous motor so that the angle of rotation of the lamp at any station indicates the distance between the ship and the surface of the earth. The synchronous motors at the various indicating stations are operated synchronously so that the indication of the depth below the ship is the same at all stations.

The lighting and extinguishing of the lamps at the various indicating stations are controlled by two gas-filled space discharge devices. Upon operation of the transmitter for sending a signal to the surface of the earth one of the gas-filled space discharge devices is broken down to effect lighting of each of the lamps. This gas-filled device remains operated and the lamps remain lighted until breakdown of the other gas-filled device. The other gas-filled device is broken down when the microphone is energized by a reflected signal.

In the accompanying drawing, Fig. 1 is a diagrammatic view of a measuring circuit constructed in accordance with the invention;

Fig. 2 is an elevational view of the measuring disc shown in Fig. 1 of the drawing; and Fig. 3 is a sectional view along the line 3—3 of Fig. 2.

Referring to Fig. 1 of the drawing a transmitter 1 which may be in the form of an impact oscillator is provided for transmitting a signal from a vessel or aeroplane to the surface of the earth. The term "ship" as used hereinafter in the specification and claims will be intended to cover either a vessel on a body of water or an aeroplane. In the patent to H. G. Dorsey No. 1,667,540, April 24, 1928 is shown a vessel provided with a measuring circuit of the type under consideration.

The transmitter 1 mounted with the apparatus of Fig. 1 on a ship (not shown) is controlled by a contactor disc 2 which is mounted on a shaft 3 of a synchronous motor 4 at a central indicating station 5. The motor 4 comprises a rotor 6 and a stator winding 7. The stator winding 7 is connected to a suitable source of alternating current 50 by means of a switch 8. The contactor disc 2 engages two brush members 9 for completing the circuit of the transmitter 1 from a battery 10. A section 11 of insulating material on the contactor disc 2 is provided for breaking the circuit of the transmitter 1 once for each rotation of the contactor disc. Whenever the brushes 9 engage the insulating section 11 of the contactor disc 2 a signal is transmitted by the transmitter 1. A switch 12 is provided for opening the circuit of the transmitter 1 to the contactor disc 2 at will.

The shaft 3 of the motor 4 also carries a measuring disc 13 which has a lamp 14 mounted on the back thereof. The lamp 14 is mounted on the disc 13 back of a slot 15 in the disc. The terminals of the lamp 14 are connected to two commutator rings 16 and 17 which are engaged by brush members 18 and 19. The measuring disc 13 is rotated within an adjustable ring 20 having a scale 21 thereon so that the angle of rotation of the lamp 14 when lighted may be easily determined. Preferably the brush members 9 engage the insulating segment 11 of the contactor disc 2 at the zero reading point of the scale 21. The ring 20 is made adjustable by means of the screws 54 to adjust the position of the scale 21. It is unnecessary to synchronize the motor at the various stations as to phase when the rings at the various stations are adjustable.

A synchronizing motor similar to the motor 4 is provided at each indicating station. Moreover a lamp similar to the lamp 14 which is mounted on a disc similar to the disc 13 is provided at each indicating station. Any desired number of indicating stations may be provided on the ship. The stator windings of the various synchronizing motors at the indicating stations are connected in parallel and are controlled by the switch 8. The lamps at the indicating stations are connected in parallel and controlled in a manner to be hereinafter set forth. In the drawing one indicating station 5 has been disclosed in detail. A second indicating station 51 is shown having a motor 52 connected to conductors 22 and a lamp 53 connected to conductors 23. The conductors 22 may be connected to the stator windings of other motors at other indicating stations and the conductors 23 may be connected to the lamps at these stations. It is obvious that instead of connecting the indicating lamps in parallel, each may have its own circuit operated from a common or multiple microphones.

A rectifier 24 which is connected to the source of alternating current 50 by means of the switch 8 supplies rectified current to two gas-filled space discharge devices 25 and 26. The rectifier 24 also supplies current for lighting the lamps 14 and 53 and the lamps at other indicating stations. The gas-filled device 25 comprises a grid 27, a cathode 28, and a plate 29. The gas-filled device 26 comprises a grid 30, a cathode 31 and a plate 32. The cathodes 28 and 31 are heated by a circuit connected through a transformer 33 to the source of alternating current 50. The plate circuit of the gas-filled device 25 is connected across the rectifier output circuit through a resistance 34. The plate circuit of the gas-filled device 26 is connected across the output circuit of the rectifier 24 through a resistance 35. The plates 29 and 32 of the two gas-filled devices 25 and 27 are connected together by means of a condenser 36. The lamps 14 and 53 and the lamps at any other indicating station are connected across the resistance element 35 in the output circuit of the space discharge device 26. Grid biasing potential for the devices 25 and 26 is supplied by the battery 10. The two gas-filled devices 25 and 26 are biased very close to their breakdown or triggering-off points.

The input circuit of the gas-filled devices 26 is connected across the circuit of the transmitter 1 by means of a transformer 38. The input circuit of the gas-filled device 26 may be traced from the grid 30 through the secondary winding of the transformer 38 and the potentiometer 39, which is connected across the battery 10, to the cathode 31. The primary winding of the transformer 38 is connected through a condenser 40 across the circuit of the transmitter 1. The input circuit of the gas-filled device 25 may be traced from the grid 27 through the secondary winding of the transformer 43 and the potentiometer 39 to the cathode 28 of the gas-filled device 25. The receiver 42 is connected to an amplifier 44 of any suitable type. The output circuit of the amplifier 44 is connected through a condenser 41 to the primary winding of the transformer 43.

Assuming the switches 8 and 12 to be closed, the circuit of the transmitter 1 through the battery 10 will be broken when the brushes 9 engage the insulating segment 11 on the disk 2. At this time a signal will be transmitted from the ship to the surface of the earth. At the same time an impulse is supplied from the transformer 38 connected to the transmitter circuit for breaking down the gas-filled space discharge device 26. At the same time the lamps 14, 53 and any other lamps connected across the resistance element 35 will be lighted. The gas-filled device 26 remains operated and the lamp 14 remains lighted until the gas-filled device 25 is broken down. The gas-filled device 25 is broken down when the signal is reflected back from the surface of the earth to the receiver 42. The receiver 42 when operated by the reflected signal impresses an impulse on the grid 27 of the gas-filled device 25 for breaking down this device. Upon breaking down of the gas-filled device 25 the charging of the condenser 36 serves to extinguish the gas-filled device 26. The extinguishing of the gas-filled device 26 serves to extinguish the lamp 14 and any other lamps connected in parallel with the lamp 14. When the space discharge device 25 breaks down it is apparent that the condenser 36 provides a low resistance path from the plate 32 to the cathode 31 of the device 26 and impresses a potential on the cathode 31 so as to extinguish the device 26.

In the above operation the lamp 14 is lighted when the gas-filled device 26 is broken down by the transmission of a signal. The lamp 14 remains lighted until the device 25 is broken down by the reflection of the signal back to the receiver 42. Accordingly the period the lamp 14 is lighted indicates the distance from the ship to the surface of the earth. The distance is indicated by the angle of rotation of the lamp 14. The angle of rotation of the measuring disc 13 may be read by means of the scale 21. When the next signal is transmitted by the transmitter 1 the gas-filled device 26 will be operated in the manner above set forth. The breaking down of the device 26 serves by means of the condenser 36 to extinguish the gas-filled device 25. The above cycle of operations will again be repeated.

Modifications in the circuits and in the arrangement and location of parts may be made within the spirit and scope of the invention and such modifications are intended to be covered by the appended claims.

What is claimed is:

1. In a measuring system for indicating the distance to earth below a ship, a motor continuously operating at constant speed, an indicating scale, a measuring disc rotated by said motor adjacent said scale, a lamp carried by said disc, a signal instrument for transmitting sound waves, means comprising a control circuit for operating said instrument to transmit a signal from the ship towards the earth, a space discharge device, means for connecting said device to said control circuit to operate said device upon transmission of a signal, means for lighting said lamp upon ignition of said device, and means comprising a second gas filled space discharge device operative upon reflection of the signal back to the ship for extinguishing the first device and the lamp.

2. In a measuring system for indicating the distance to earth below a ship, a synchronous motor, an indicating scale, a measuring disc rotated by said motor adjacent said scale, a lamp carried by said disc, two gas-filled space discharge devices connected to a source of potential and biased near their breakdown point, means comprising a capacity connection between the anodes of said devices to insure against simultaneous operation of the two devices and to extinguish one device when the other device is ignited, a signal instrument for transmitting signals from the ship towards the earth, a control circuit for operating said signal instrument, means for connecting the first one of said devices to said operating circuit to ignite the device when the control circuit is energized, means for lighting and extinguishing said lamp according to the operation of said device, means for energizing said control circuit to transmit a sound wave signal from the ship towards the earth and to ignite the first one of said devices, and means operative upon reflection of the signal back to the ship for breaking down the other device to extinguish the first device and to extinguish the lamp.

3. In a measuring system for indicating the distance to earth below a ship, a continuously rotating motor, an indicating scale, a measuring disc rotated by said motor adjacent said scale, a lamp carried by said disc, two three element gas-filled space discharge devices, a source of potential, a resistance element connected to the plate of each device, the output circuits of the devices including said resistance elements being connected in parallel to said source, a condenser connected between the plates of said devices, means for connecting said lamp across one of said resistance elements, said devices being biased near their breakdown point, a signal device for transmitting signals from the ship towards the earth, a control circuit for operating said signal device, a grid circuit for the first one of said devices connected to and operated by the operating circuit of said signal device, means for energizing said control circuit to transmit a sound wave signal from the ship towards the earth and to break down said first device to light said lamp, and means upon reflection of the signal back to the ship for breaking down the other device to extinguish the first device and to extinguish the lamp.

4. In a measuring system for indicating the distance to earth below a ship at a plurality of separate stations on the ship, a plurality of synchronous electric motors operating synchronously together and respectively located at the different stations on the ship, lamps respectively rotated by said motors, two gas-filled space discharge devices of large current carrying capacity and each having a control grid biased near the ignition point, each of said devices triggering off suddenly upon application of suitable potential to the control grid and remaining in operative condition irrespective of the grid potential, means controlled by one of said motors for transmitting a sound wave signal from the ship towards the earth, means for impressing a potential on the control grid of the first one of said gas-filled devices to ignite the latter, whereby it remains in operative condition upon transmission of a signal, means for simultaneously supplying current to said lamps from the output of said first device upon ignition of said first device, means for impressing potential on the grid of said second device upon reflection of the signal back to the ship to ignite said second device, and means for extinguishing the first device and said lamps upon ignition of the second device to give similar depth indications at the stations according to the angle rotated by the lamps when lighted.

5. In a measuring system for indicating the distance to earth below a ship at a plurality of separate stations on the ship, a plurality of synchronous electric motors operating synchronously together and respectively located at the different stations on the ship, lamps respectively rotated by said motors, two gas-filled space discharge devices of large current-carrying capacity and each having a control grid biased near the ignition point, each of said devices triggering off suddenly upon application of suitable potential to the control grid and remaining in operative condition irrespective of the grid potential, means controlled by one of said motors for transmitting a sound wave signal from the ship towards the earth, means for impressing a potential on the control grid of the first one of said gas-filled devices to ignite the latter, whereby it remains in operative condition upon transmission of a signal, means for simultaneously supplying current to said lamps from the output of said first device upon ignition of said first device, means for impressing potential on the grid of said second device upon reflection of the signal back to the ship to ignite said second device, and means comprising a condenser connection between the anodes of said gas-filled devices for extinguishing the first device and said lamps upon ignition of the second device.

6. In a measuring system for indicating the distance to earth below a ship at a plurality of separate stations on the ship, a plurality of synchronous electric motors operating synchronously together, a measuring disc rotated by each of said motors, a lamp carried by each of said discs, a measuring ring adjustably mounted adjacent to each disc and having a measuring scale thereon, said rings being adjustable to correct for phase differences in the rotation of the motors at the different stations, two gas-filled space discharge devices of large current carrying capacity and each having a control grid biased near the ignition point, each of said devices triggering off suddenly upon application of suitable potential to the control grid and remaining in operative condition irrespective of the grid potential, means controlled by one of said motors for transmitting a sound wave signal from the ship towards the earth, means for impressing a potential on the control grid of the first one of said gas-filled devices to ignite the latter, whereby it remains in operative condition upon transmission of a signal, means for simultaneously supplying current to said lamps from the output of said first device upon ignition of said first device, means for impressing potential on the grid of said second device upon reflection of the signal back to the ship to ignite said second device, and means for extinguishing the first device and said lamps upon ignition of the second device to give similar depth indications at the stations according to the angle rotated by the lamps when lighted.

EDMUND R. MORTON.